May 31, 1966  RIKURO KOJIMA  3,253,321
MACHINE FOR AFFIXING A STOP MEMBER ON A SLIDE FASTENER
AND FOR CUTTING THE SLIDE FASTENER TO LENGTH
Filed Oct. 23, 1963  10 Sheets-Sheet 10

United States Patent Office 3,253,321
Patented May 31, 1966

3,253,321
MACHINE FOR AFFIXING A STOP MEMBER ON A SLIDE FASTENER AND FOR CUTTING THE SLIDE FASTENER TO LENGTH
Rikuro Kojima, Kurobe-shi, Japan, assignor to Yoshida Kogyo K.K., Tokyo, Japan, a corporation of Japan
Filed Oct. 23, 1963, Ser. No. 318,340
Claims priority, application Japan, Nov. 12, 1962, 37/50,655
8 Claims. (Cl. 29—33.2)

The present invention relates to a machine by which an end stop metal member, which connects the fastener strips of a slide fastener at one end thereof, is affixed to the strips.

According to the present invention, in the manufacture of sliding clasp fasteners, one operation involves affixing the end stop metal member to the foremost end of each tooth alignment of a long continuous fastener chain wherein the left and right strips are interengaged, whereas a second operation involves cutting the chain into fastener units, such operations being performed simultaneously by the synchronized operation of a single machine.

As presently known, the operation of affixing the end stop metal member on the strips and the operation of cutting the fastener chain into units are similar operations that are performed in correlation, yet there is no machine known which performs both operations simultaneously. The reason for that is that it is very difficult to completely synchronize the supply and attachment of the end stop metal members, which requires a very complicated driving mechanism, and the cutting of the fastener chain, which is very simple. Furthermore, since both of said operations are performed by machines working semi-automatically and intermittently, a very accurate automatic stop clutch has to be provided inside a machine of small type.

According to the present invention, the machine is so constituted as to have the working parts inside the machine divided into 3 systems for a supply and fixing punch of the end stop metal members, in conjunction with a clinching die corresponding thereto, and a chain cutter, and wherein the clinching die and the chain cutter operate simultaneously by means of a switching operation of duplex clutches mounted on the central portion of a main drive shaft, the supply and fixing punch being operative immediately after the completion of the end stop metal fixing and the chain cutting, each of the working parts being stopped at respective and the same working positions all times, whereby said 2 operations are performed simultaneously by the use of a single unit of small type machine.

The invention will next be described in conjunction with an embodiment thereof as illustrated in the attached drawing.

Figure 1:
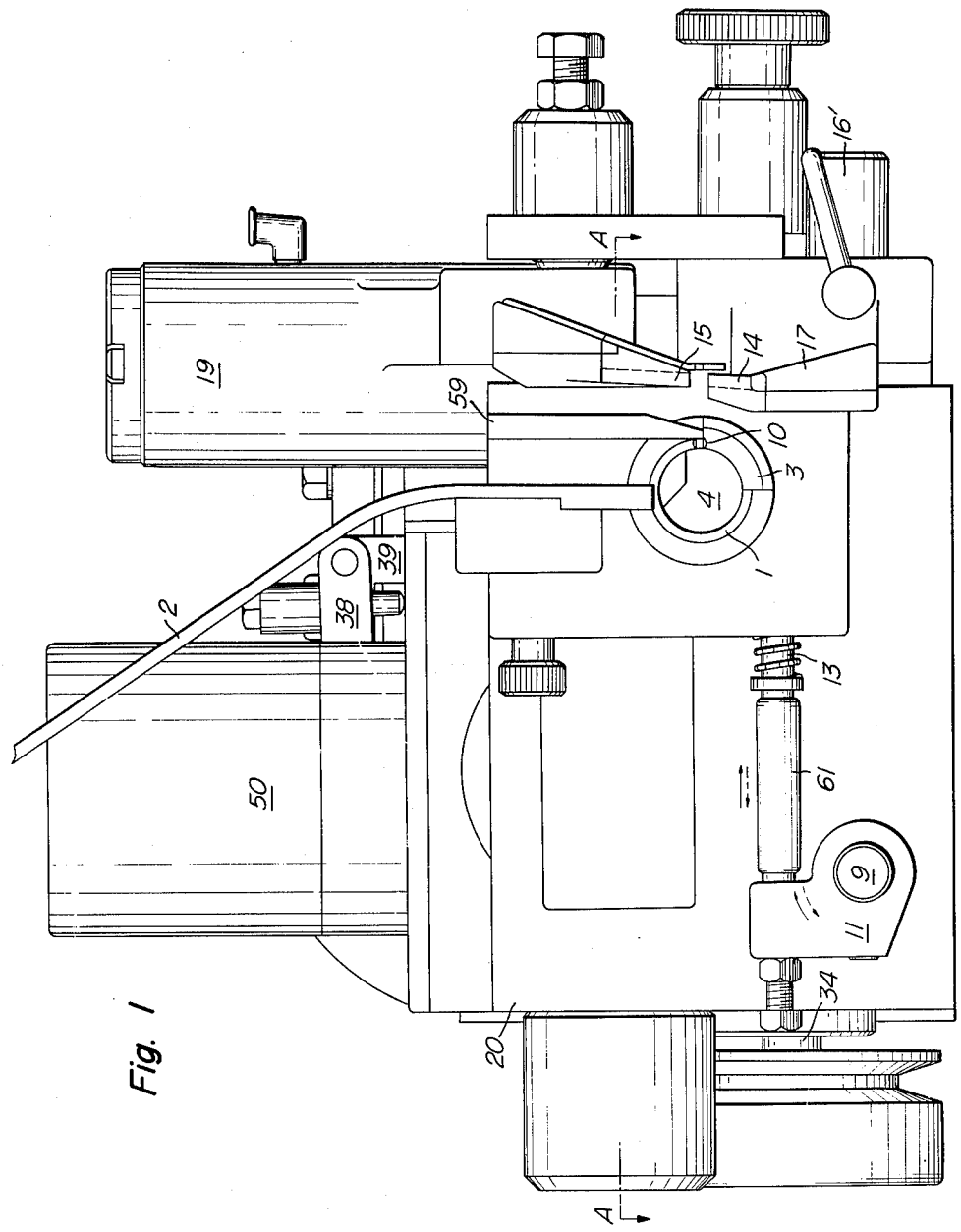
Figure 2:
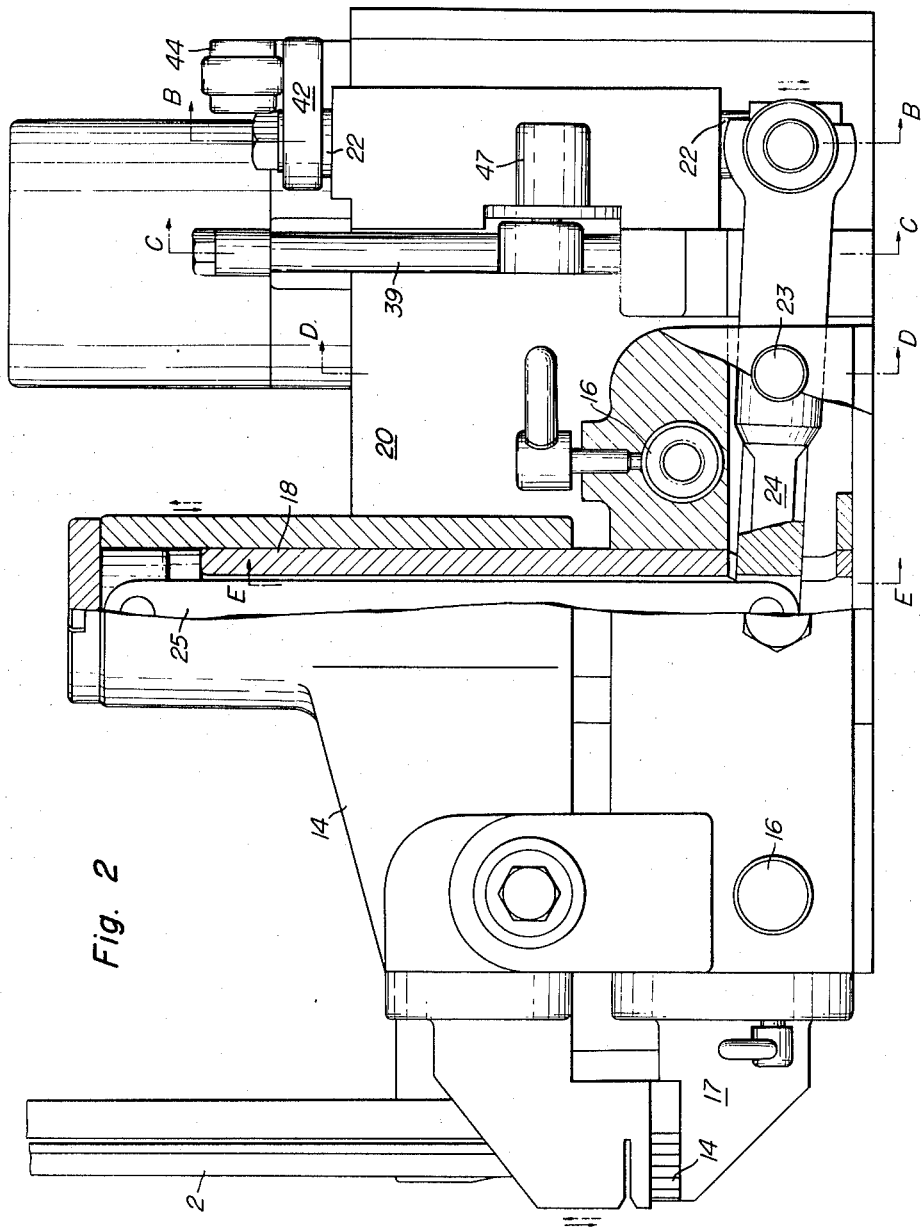
Figure 3:
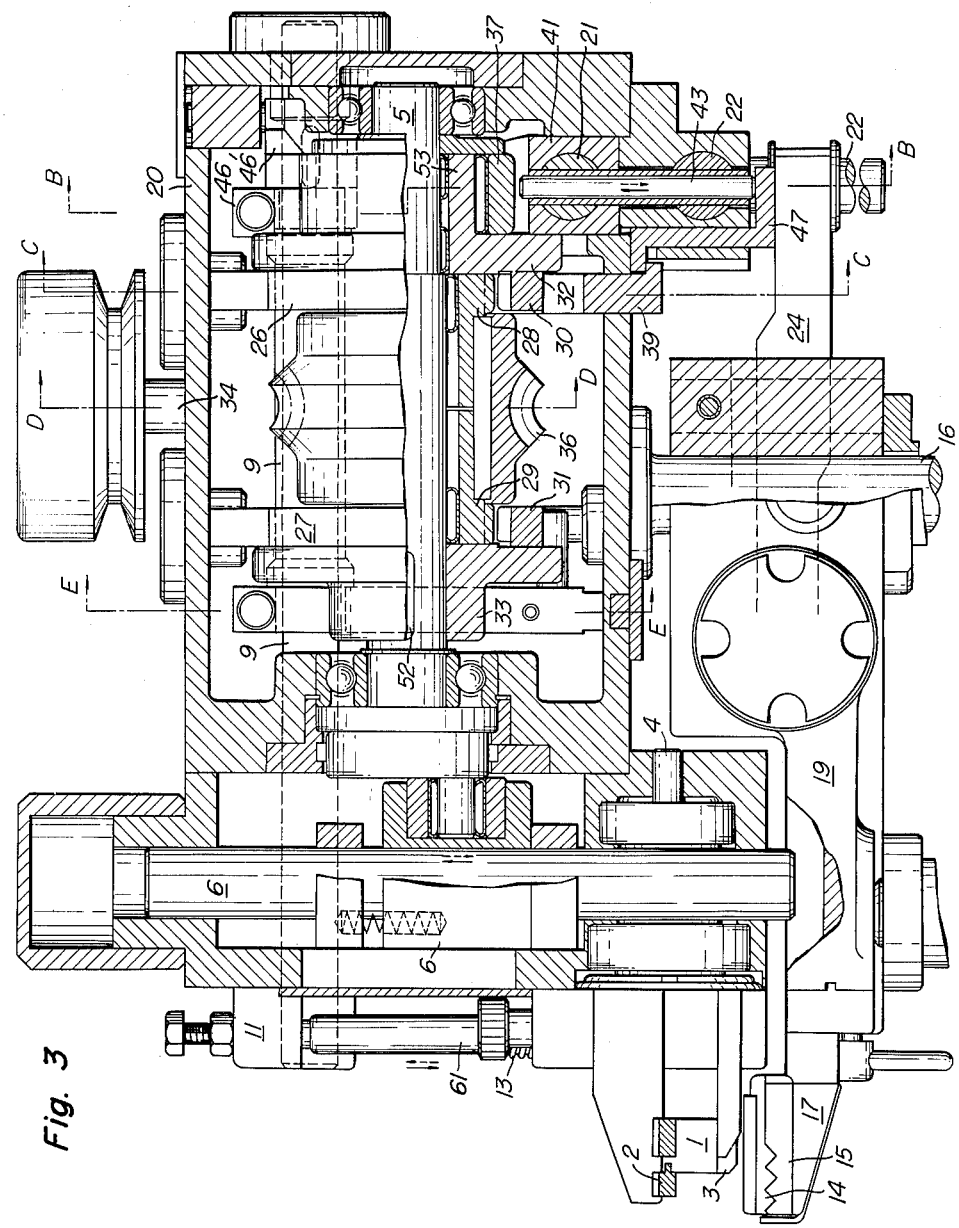
Figure 4:
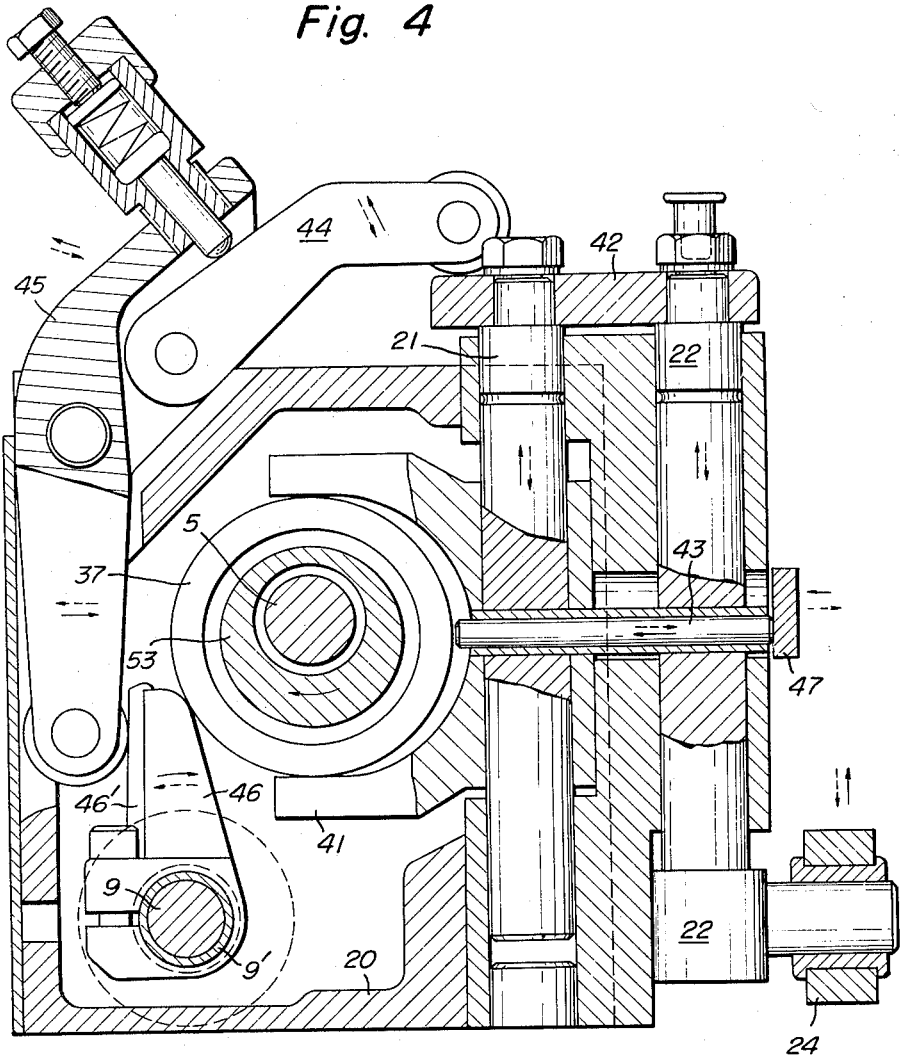
Figure 5:
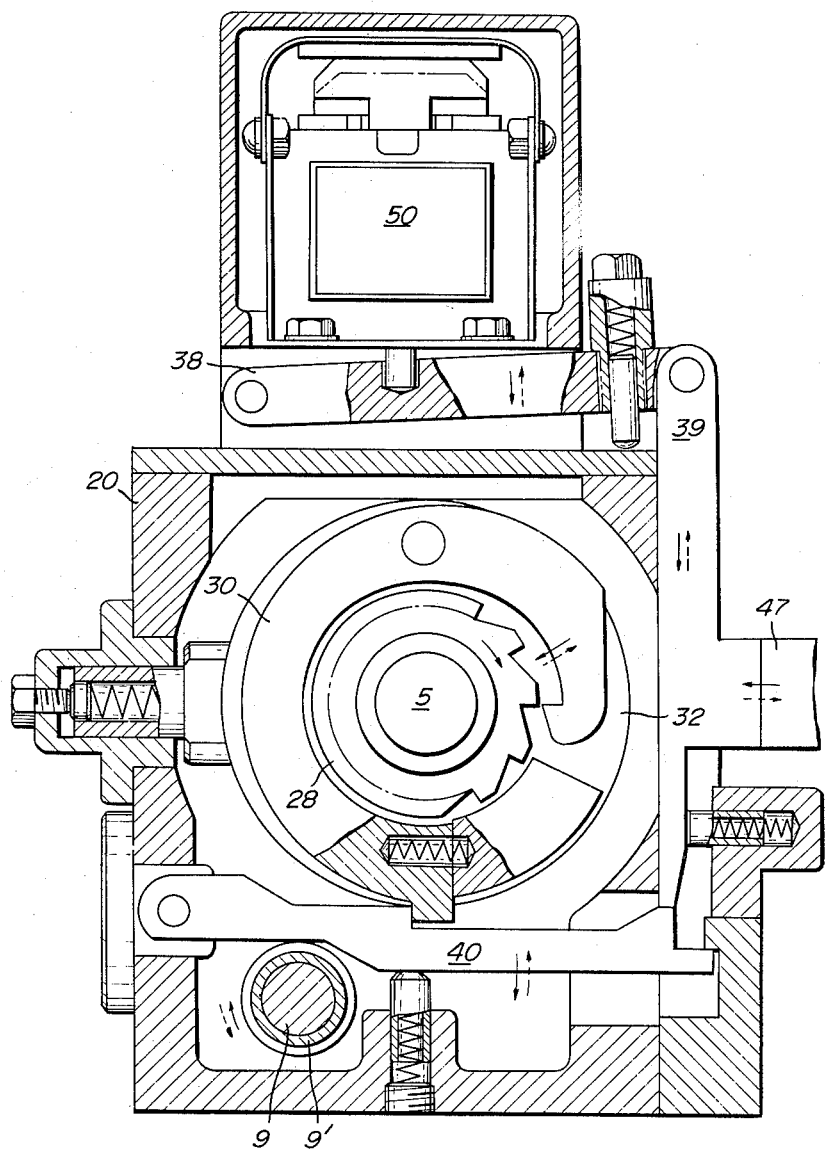
Figure 7:
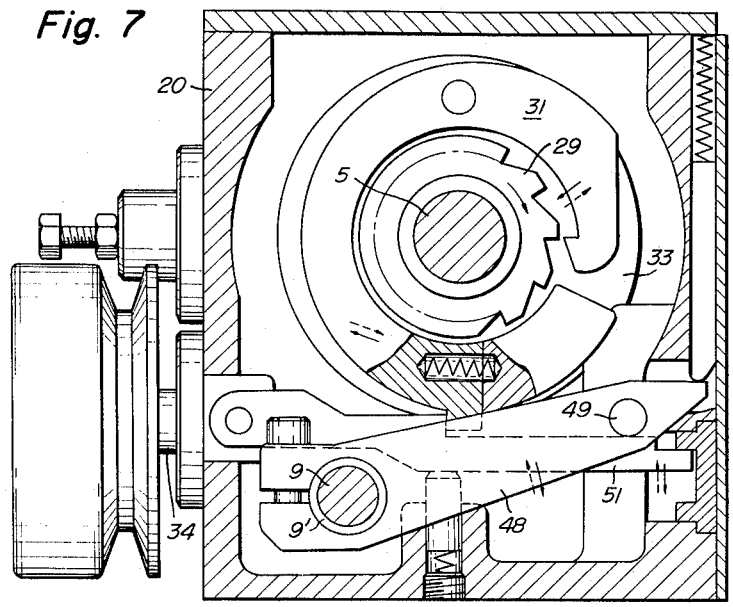
Figure 8:
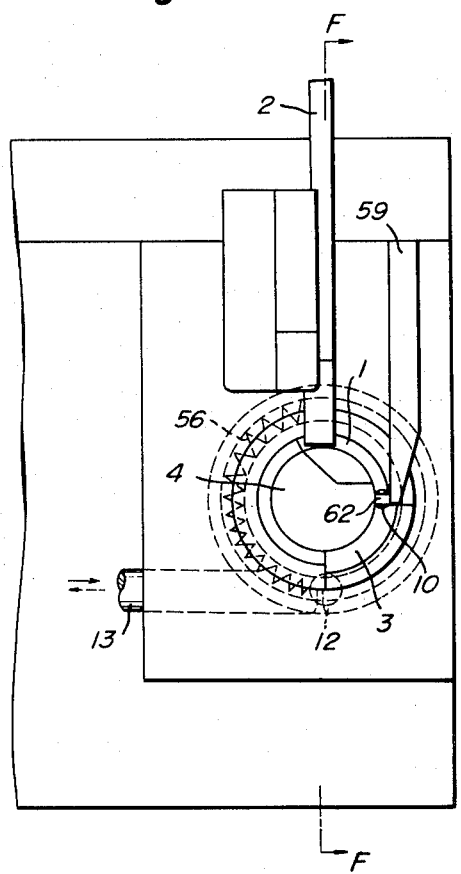
Figure 9:
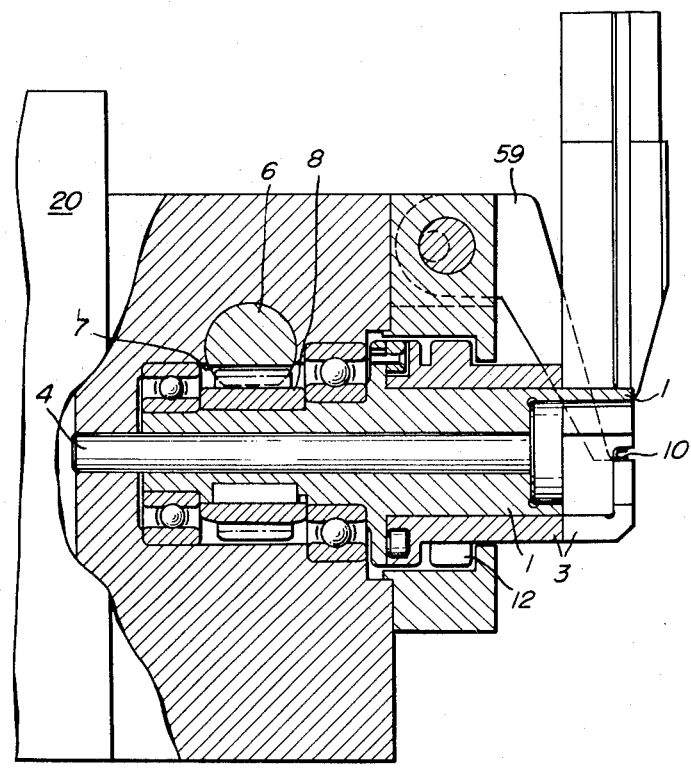
Figure 10A:
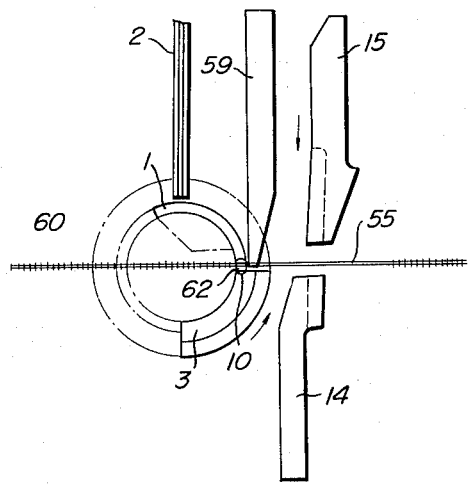
Figure 10B:
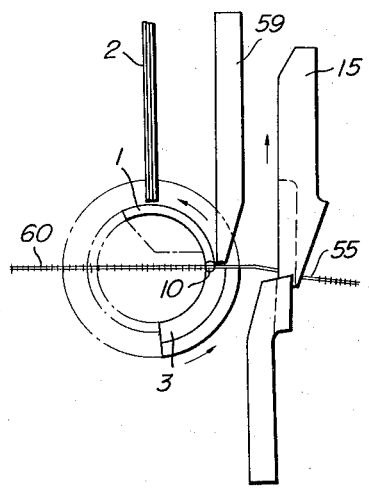
Figure 10C:
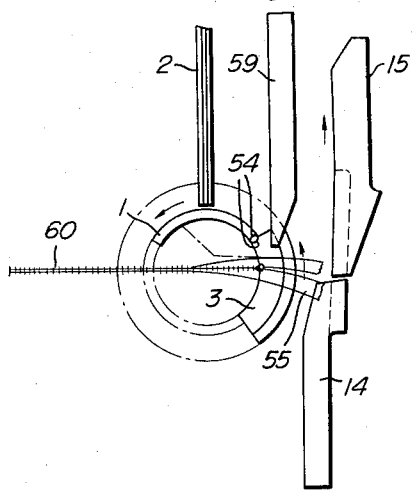
Figure 10D:
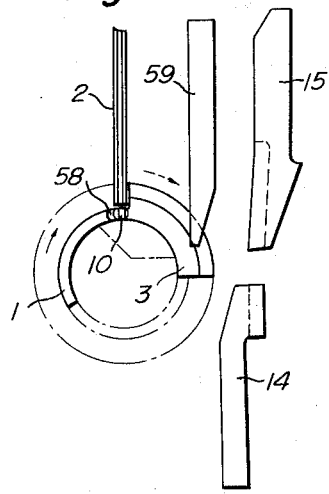
Figure 10F:
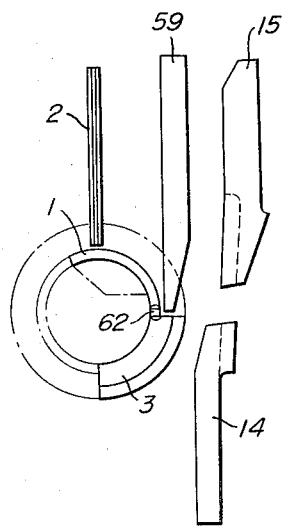
Figure 10E:
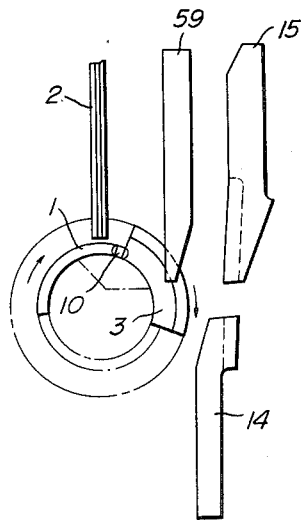

In the drawings: FIG. 1 is a front view of the construction of the end stop metal affixing machine according to the present invention, FIG. 2 is a side view thereof partly sectioned, FIG. 3 is a sectional view taken along line A—A of FIG. 1, FIG. 4 is a sectional view taken along line B—B of FIG. 3, showing the transmission mechanism inside the machine according to the present invention, FIG. 5 is a sectional view taken along line C—C of FIG. 3, showing the construction of the first clutch thereof, FIG. 6 the section through the line D—D of FIG. 3 as seen in showing the speed reduction mechanism of the power input shaft thereof, FIG. 7 is a sectional view taken along line E—E of FIG. 3 showing the construction of the second clutch thereof, FIG. 8 is a front view showing the construction of the end stop metal affixing means thereof, FIG. 9 is a sectional view taken along line F—F, and FIGS. 10a and 10f are front views showing the operating states of the clinching punch and the tape cutter of the machine according to the present invention.

Now describing the construction of the machine with reference to the accompanying drawing, numeral 1 indicates a punch for receiving an end stop metal member 10 fed through a supply chute 2 for conveying the same to a position where it will be installed on the strips of a slide fastener by a pressing operation. Numeral 3 is a clinching die for pressing the end stop metal member 10 from the underneath thereof during installation of the member 10 to the strip of a slide fastener. Both the punch 1 and the die 3, are mounted on a fixed shaft 4 forwardly projecting from the machine frame 20, and can rotate around the periphery of said shaft 4 in the direction indicated by the arrows in FIG. 10. The operation of the punch 1 is performed by a pinion 8 (FIG. 9) in the rear portion of the punch 1 rotating alternately both left and right by the action of a rack 7 provided on the underneath surface of a crank rod 6 reciprocating with the rotation of a main shaft 5 (FIG. 3). The operation of the die 3 is performed by the reciprocating motion of a hammer 13 which contacts a peripheral projection 12 of the die 3 by virtue of the operation of a connecting rod 61 through a lever 11 swinging in synchronization with the alternating rotation of a secondary shaft 9. Numerals 14 and 15 indicate a cutting die and a punch, respectively, provided adjacent to the press work portion of the machine, the die 14 being secured to a die holder 17 mounted slidably and adjustably freely on projected shafts 16, 16′ on one side of the machine frame 20, the punch 15 being secured to a ram 19 mounted on a guide cylinder 18 in the rear portion of said die holder 17 so as to perform up and down motion in synchronism with the die 3 by virtue of a lever 24 swinging about a pin 23 as its pivot and a link 25 moving up and down in accompaniment with the swinging motion of said lever 24. The lever 24 is caused to pivot about pin 23 by the action of sliding pins 21, 22 which move up and down in correspondence with the rotation of the rear cylindrical portion 53 of a flange 32 as will be explained more fully hereinafter.

Consequently, both the press work portion and the cutting work portion which directly operate on the fastener chain do so independently and respectively through the driving mechanisms of said 3 systems, but each of the means is driven substantially in synchronism by means of the switching action of a first clutch 26 and a second clutch 27 mounted on the main shaft and each of them is so adapted as to stop at its respective working position.

Figure 6:
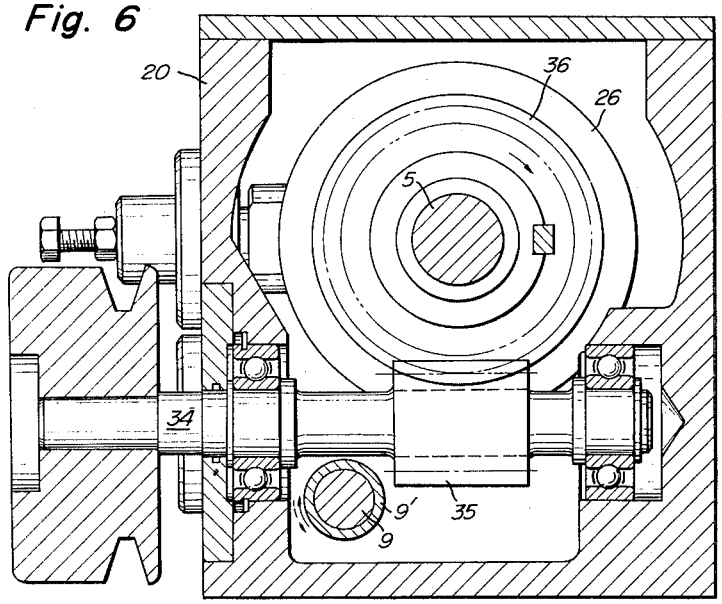

Now, the construction of each of the clutches and the working mechanism within the machine will be described in detail with reference to the accompanying drawings. As illustrated in FIG. 3 there is mounted rotatably on the main shaft 5, a pair of ratchet wheels 28, 29. Flanges 32, 33 are also mounted on shaft 5 and are affixed with swinging ratchets 30, 31 engaging said ratchet wheels 28, 29. On the outer periphery of the ratchet wheels 28, 29, as shown in FIG. 6, a worm wheel 36 is affixed which engages a worm 35 of a power input shaft 34. The front flange 33 is secured to the main shaft 5, but the rear flange 32 is mounted on the main shaft rotatably, and as shown in FIG. 4 the rear cylindrical portion 53 thereof is formed as an eccentric ring. A roll 37 is mounted rotatably on the outer surface of the eccentric ring. Accordingly, the rotation of the power input shaft 34 is first transmitted to the ratchet wheels 28, 29 on the outer periphery of the main shaft through the worm 35 and the worm wheel 36, and as shown in FIG. 5 is then transmitted to the flange 32 through the ratchet 30 which is engaged with the ratchet wheel 28 when the controlling claw of a shifter 40 is detached through a clutch link 38 and a clutch lever 39 of the first clutch 26 working in order as indicated by arrows in correspondence with the action of a solenoid 50 excited by means of a foot pedal (not shown).

The rotation of the flange 32, as shown in FIG. 4 causes the roll 37 to move up and down which in turn causes a crank rod 41 fixedly mounted on the sliding pin 21 on the inner side thereof, also move up and down. The sliding pin 22 on the outer side is connected to pin 21 by plunger 43 and thereby undergoes movement with pin 21. The pin 22 is connected to a roll plate 42 at the upper portion thereof which acts on levers 44, 45 arranged circumferentially around the main shaft 5 to cause a lever 46' mounted securely on the secondary shaft 9 to be swung whereby the secondary shaft 9 is rotated both left and right by a predetermined magnitude per rotation of the flange 32. Said eccentric ring not only operates the cutting punch 15 by having the outer side sliding pin 22 moved up and down through the roll 37, but the ring 37 also pushes the plunger 43 outwardly as indicated by the arrows per rotation, whereby the clutch lever 39 of the first clutch 26 is swung to the right as shown in FIG. 5 by the action of a hook 47 at the rear end portion of said plunger. Thereby the shifter 40 is caused to assume its original position and release the engagement of the clutch lever 39 and said shifter 40, after the completion of the preceding pressing and cutting operation there is no danger of the continuation of the operation unless the solenoid 50 is reactivated by having the foot pedal operated again. The power of the input shaft 34 is thus transmitted by said various movements to effect movement of the secondary shaft 9, and to move the swinging lever 24 which operates the die 3 and the cutting punch 15 respectively. The rotation of the main shaft 5 which operates the punch 1 is effected subsequently by having the alternating rotation of a sleeve 9' fitted on the secondary shaft 9 act on the second clutch 27. That is, the sleeve 9' is rotated both left and right by a lever 46 which is moved up and down by the roll 37 upon rotation of the eccentric ring. Consequently the clutch lever 48, as shown in FIG. 7, swings up and down in accompaniment with the rotation of said sleeve and a shifter 51 is thereby swung up and down by a projected pin 49 at the end portion of lever 48 whereby the ratchet 31 of the second clutch 27 engages the ratchet wheel 29 and rotates the main shaft 5 one rotation by means of the secured relation of flange 33 on shaft 5 by key 52. In consequence, since the rotation of the main shaft 5 is performed immediately after the completion of the rotation of the secondary shaft 9 to the right, the operation is adapted to the working mechanisms of said 3 systems. Thus, the secondary shaft 9 rotates the caulking die 3 while the ram 19 effects lowering of the cutting punch 15 in simultaneous operation, and only the rotation of the main shaft 5 rotating the punch 1 is performed immediately after the action of the die 3 and the cutting punch 15. Since the stop points of operation of the first and second clutches 26, 27 always assume the engaged positions of each of the shifters 40, 51 and each of the ratchets 30, 31, each of the working parts is always ready to operate from its initial relative position.

In the operation of the machine as described above, the press work portion and the cutting work portion thereof maintain normally a stopped state in the relative positions as illustrated in FIG. 10–a, the cutting punch 15, and the cutting die 14 being opposed to each other at a maximum spaced distance, the punch 1 and the die 3 being ready to operate respectively, and holding an end stop metal member 10 horizontally inserted between recesses 54, provided on respective upper and lower ends thereof.

Now, the foremost end portion of the tooth alignment of the fastener chain 60 is inserted into a forked gap of the end stop metal member 10, and after a spaced portion 55 is inserted into the spacing between the cutting punch 15 and die 14, the solenoid 50 is activated by stepping on the pedal (not shown), and the secondary shaft 9 and the ram 19 are operated first, and thereby the die 3 and the cutting punch 15 only, respectively and simultaneously, perform rotation and move as indicated by the arrows, whereby the end stop metal member 10 is affixed to the foremost end portion of the fastener chain 60 as shown in FIG. 10–b and the spaced portion 55 is cut off at the predetermined position.

When the operations of affixing the end stop metal 10 and of cutting the spaced portion 55 are finished, the main shaft 5, which has been stationary, begins to rotate by the action of the second clutch 27 and the punch 1 rotates to the left as indicated by the solid arrow shown in FIG. 10–b. The die 3 moved with the punch 1 under the action of a coil spring 56 (FIG. 8) in the rear thereof as shown in FIG. 10–c. Then, when the rotations of the punch 1 and the die 3 reach the positions indicated in FIG. 10–d and the die 3 reach the positions indicated in the side of the shute 2 for supplying in FIG. 10–c during said operation by means of a claw 59 projecting downwardly towards the upper surface of the die 3. The cutting punch 15 returns to its initial state by the rise of the ram 19. Consequently, only the rotation of the main shaft 5 is now continued, whereby the punch 1 is rotated to the right as shown in FIG. 10–e and comes to a standstill after having rotated with the succeeding end stop metal member 10 held in the recess 54, between it and the die 3 to the position shown in FIG. 10–f and returns to its initial position.

As described above, when the machine according to the present invention is employed, both the affixing of the end stop metal and the cutting of the fastener chain, which have been performed in 2 processes heretofore, can now entirely be performed in a single process simultaneously, and in addition the cutting of the fastener chain can be executed very accurately. Furthermore, the machine according to the present invention presents various other advantages such as the avoidance of automatic stop clutches of link construction, with their complicated projected drive levers as in the conventional machines. Thereby almost no trouble in the operation of the machine is experienced and also the construction of the machine can be made extremely compact.

What is claimed is:

1. A machine for both affixing a stop member to a slide fastener strip and for cutting said strip to separate a length therefrom, said machine comprising a main drive shaft, a punch supported for angular oscillation, drive means for angularly oscillating said punch by the rotation of said main shaft; an auxiliary drive shaft arranged parallel to said main shaft, a clinching die driven by said auxiliary shaft; said punch and die being mounted in opposed relation with each other; a cutting punch and a die therefor disposed adjacent the first said punch and die; said cutting punch being reciprocally movable in a vertical direction in relation to said die therefor and driven by the same means which drives the first said punch; first and second clutch means mounted on said main shaft; said first clutch means being operative to drive said auxiliary shaft driving said clinching die and said second clutch means being operative to rotate said main shaft a half period later than the operation of said auxiliary shaft.

2. A machine for both affixing a stop member to a slide fastener strip and for cutting said strip to separate a length thereof, said machine comprising a frame, a fixed shaft on said frame, a punch and a clinching die mounted on said fixed shaft for rotation, a main drive shaft, means for driving the punch in rotation in alternate opposite directions from said main shaft, a secondary shaft adapted for being driven in alternate opposite directions, means for driving the clinching die in rotation in alternate opposite directions from the secondary shaft, a cutting punch and a die therefor mounted on said frame adjacent the first said punch and die to cut a slide fastener strip on which the stop member is to be installed, a power input shaft, and first and second clutch means mounted on said main shaft, and engageable with said input shaft to transmit the drive thereof, said first clutch means having a normally uncoupled state and being adapted for being activated to coupled state by an external operation, said first clutch means in said coupled state being operative to enable driving of said cutting punch and said secondary shaft and thereby the clinching die in synchronized rotation from said input shaft, said second clutch means having a normally uncoupled state and being activated to coupled state by the first clutch means subsequent to the operation of said cutting punch and the clinching die, said second clutch means in coupled state being operative to permit drive of the main shaft from said input shaft, to thereby enable driving of the first said punch.

3. A machine as claimed in claim 2, wherein said first clutch means includes a ratchet wheel rotatable on the main shaft, and a flange also rotatable on the main shaft, said ratchet wheel being in driving relation with the input shaft, said flange and ratchet wheel being disengaged in the uncoupled state of the clutch means and being coupled in driving engagement in the coupled state, said flange including a portion with an eccentric ring, said means for driving the first said punch being engaged with said eccentric ring for being driven thereby, and means engaged with the eccentric ring and with the secondary shaft to drive the latter from said ring.

4. A machine as claimed in claim 3, further comprising means in engagement with said eccentric ring for returning the first clutch means to uncoupled state after rotation of said ring.

5. A machine as claimed in claim 3, comprising means coupled to said second clutch means for activating the same to coupled state, said eccentric ring being engaged with the latter said means to cause activation of the second clutch means subsequent to the operation of the cutting punch and the clinching die such that a stop member which is inserted between said clinching die and the associated punch is first clamped to the slide fastener strip after which both the clinching die and its associated punch are moved together, while the fastener strip is cut by the cutting punch simultaneous with the clamping of the stop member.

6. A machine as claimed in claim 5, wherein said second clutch means comprises a ratchet wheel secured to said main shaft for common rotation and a flange rotatably mounted on said main shaft and engageable with the ratchet wheel in driving relation in the coupled state, said ratchet wheel of the second clutch means being driven in rotation by said input shaft.

7. A machine as claimed in claim 6, wherein said means for activating the second clutch means to coupled state comprises a shifter member for acting on said flange to engage the same in driving relation with the ratchet wheel of the second clutch means in response to rotation of the eccentric ring of the first clutch means.

8. A machine as claimed in claim 7, wherein said means for activating the second clutch means to coupled state further comprises a sleeve mounted for rotation around said secondary shaft, a lever coupled to said sleeve and acting on said shifter member to cause engagement of said flange and ratchet wheel of the second clutch means and a further lever secured to said sleeve for being acted on by said eccentric ring to rotate said sleeve.

No references cited.

RICHARD H. EANES, JR., *Primary Examiner.*

F. I. SMITH, *Assistant Examiner.*